INVENTOR.
LUN FAT KWAN

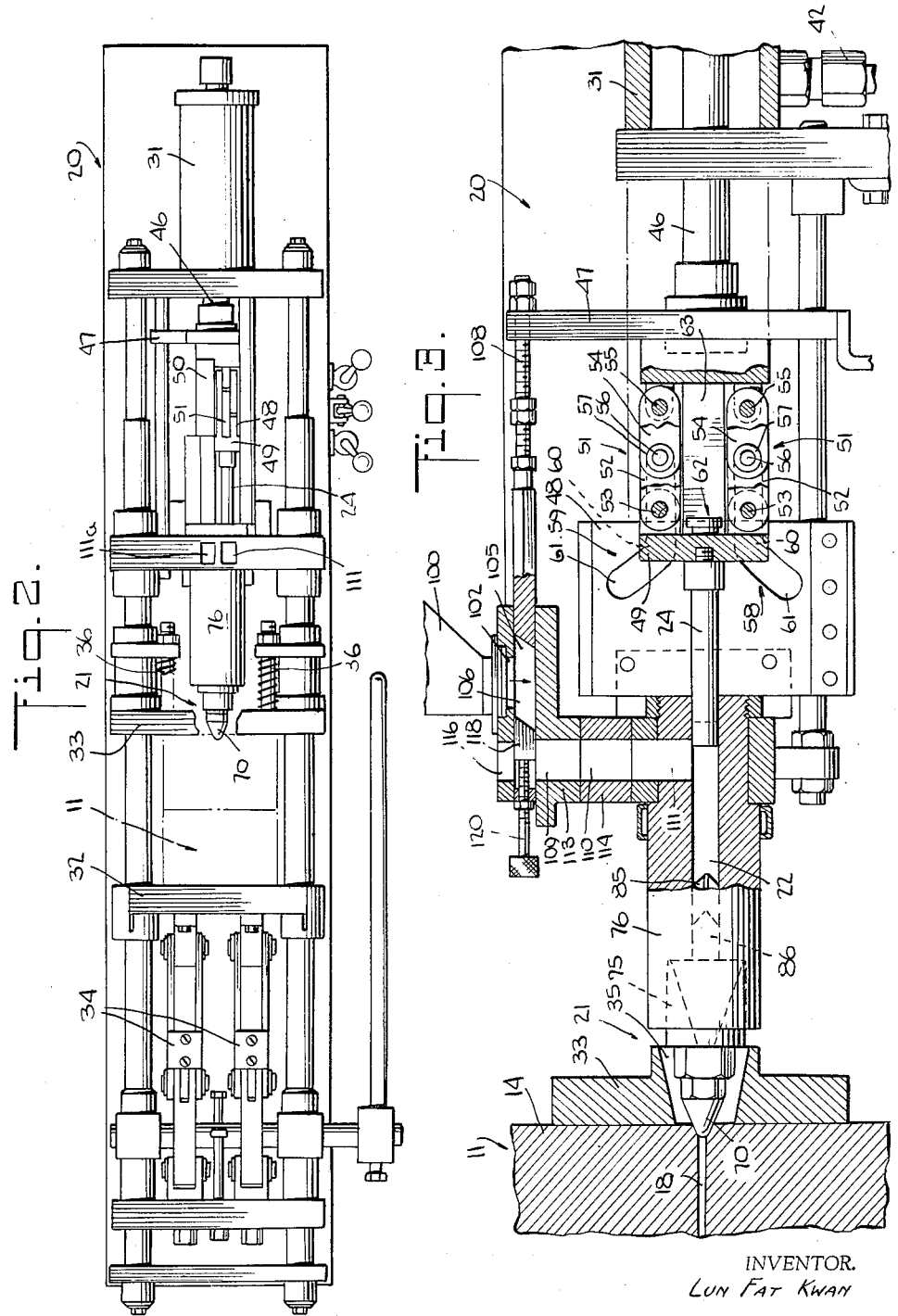

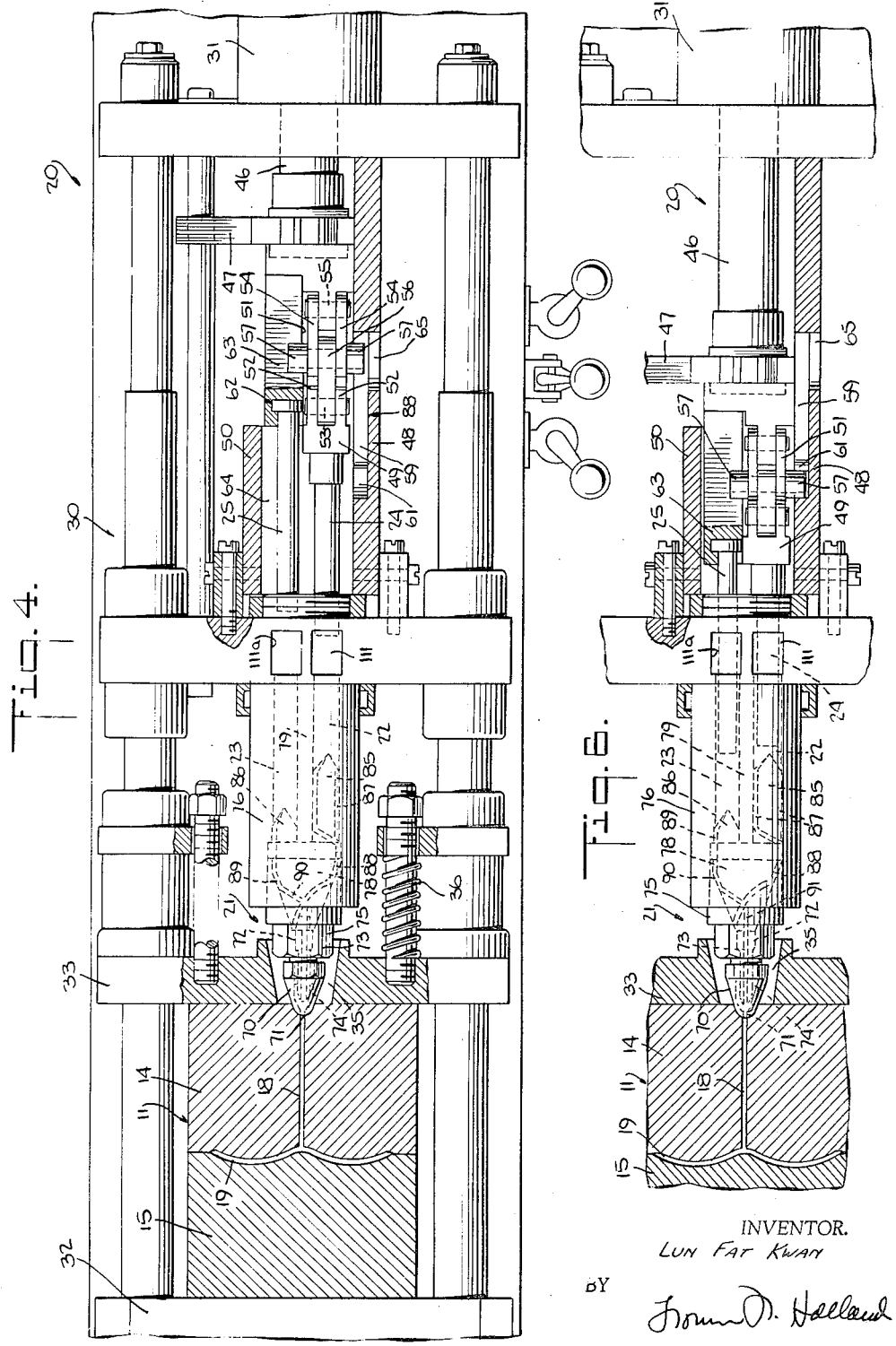

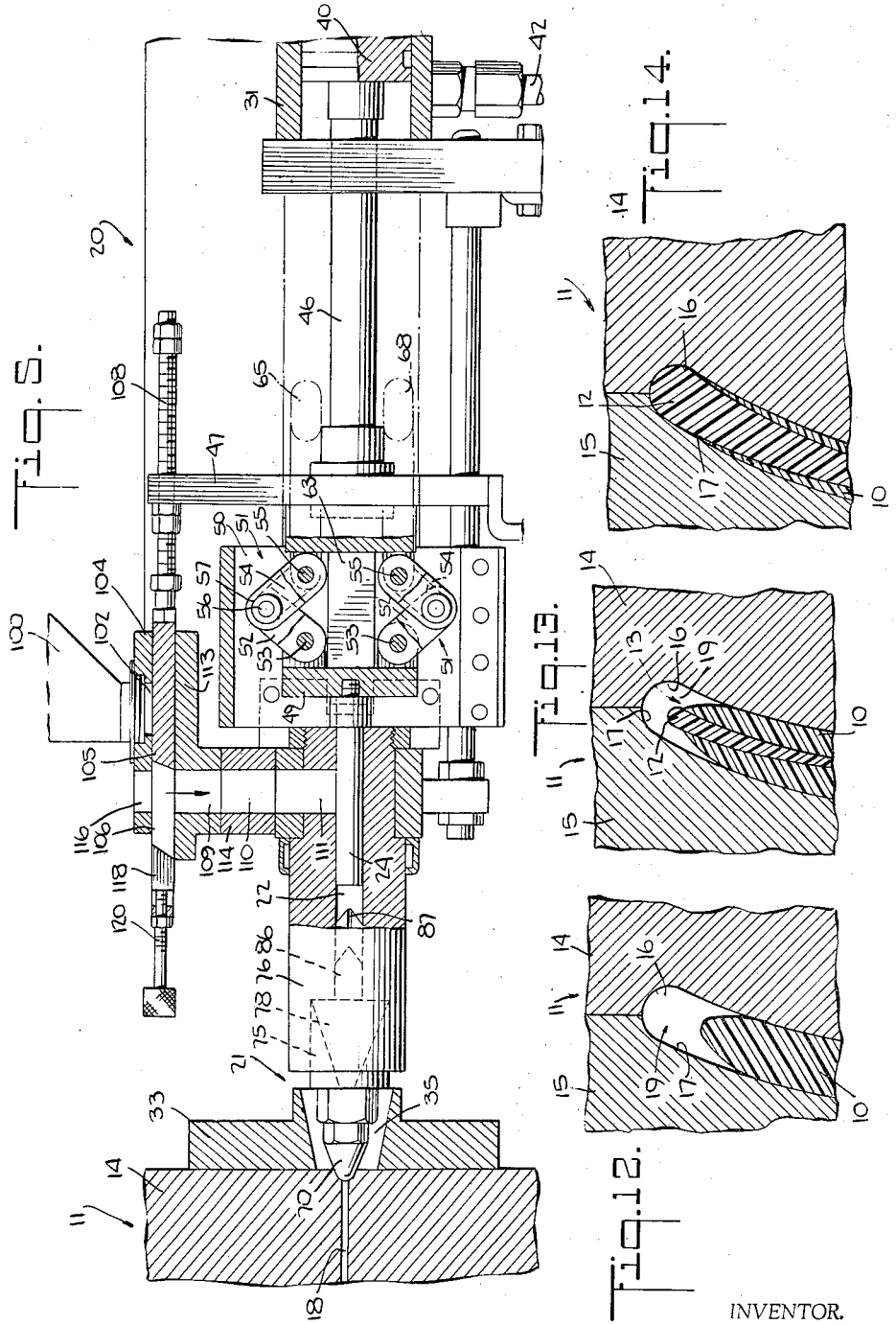

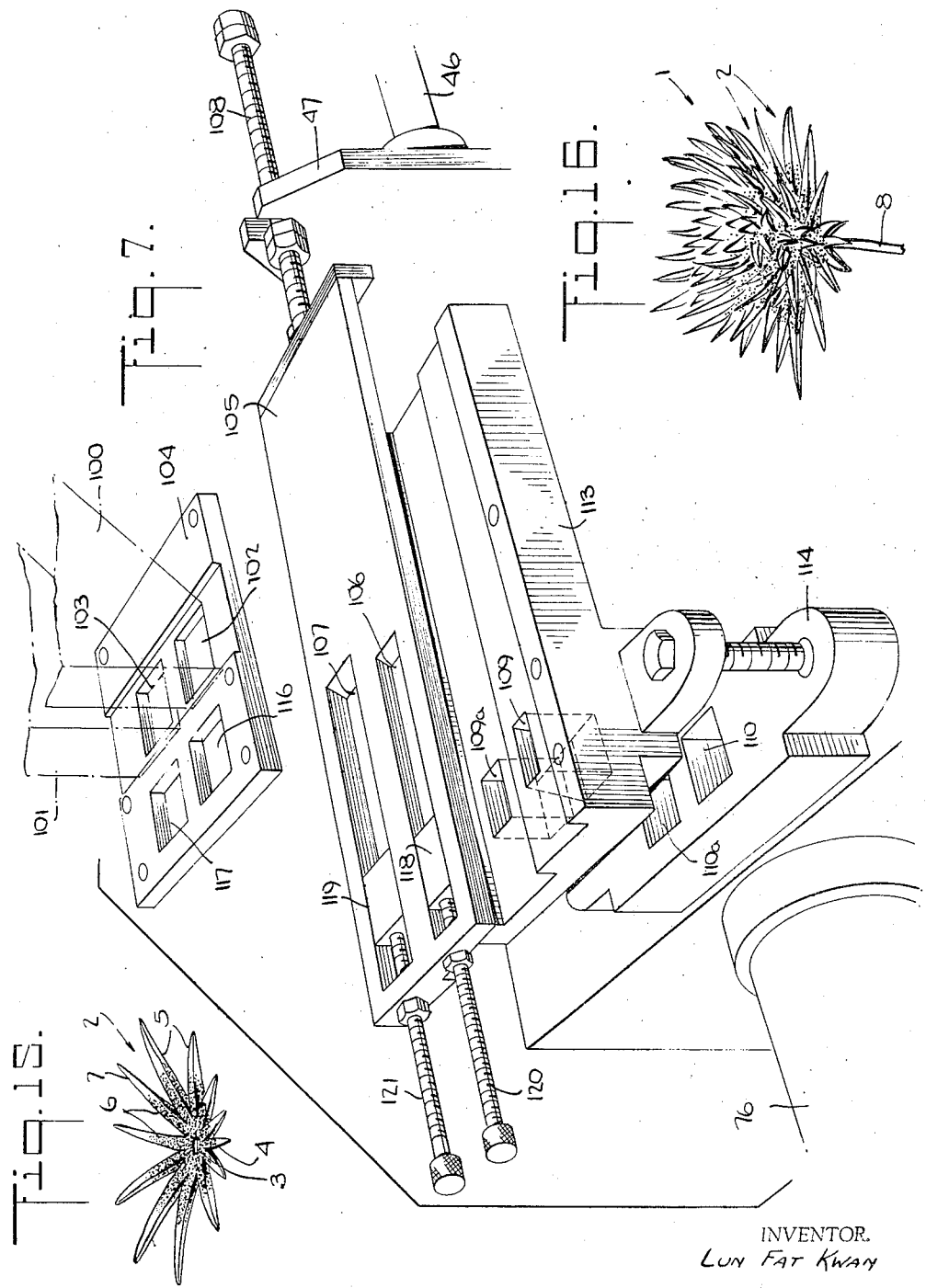

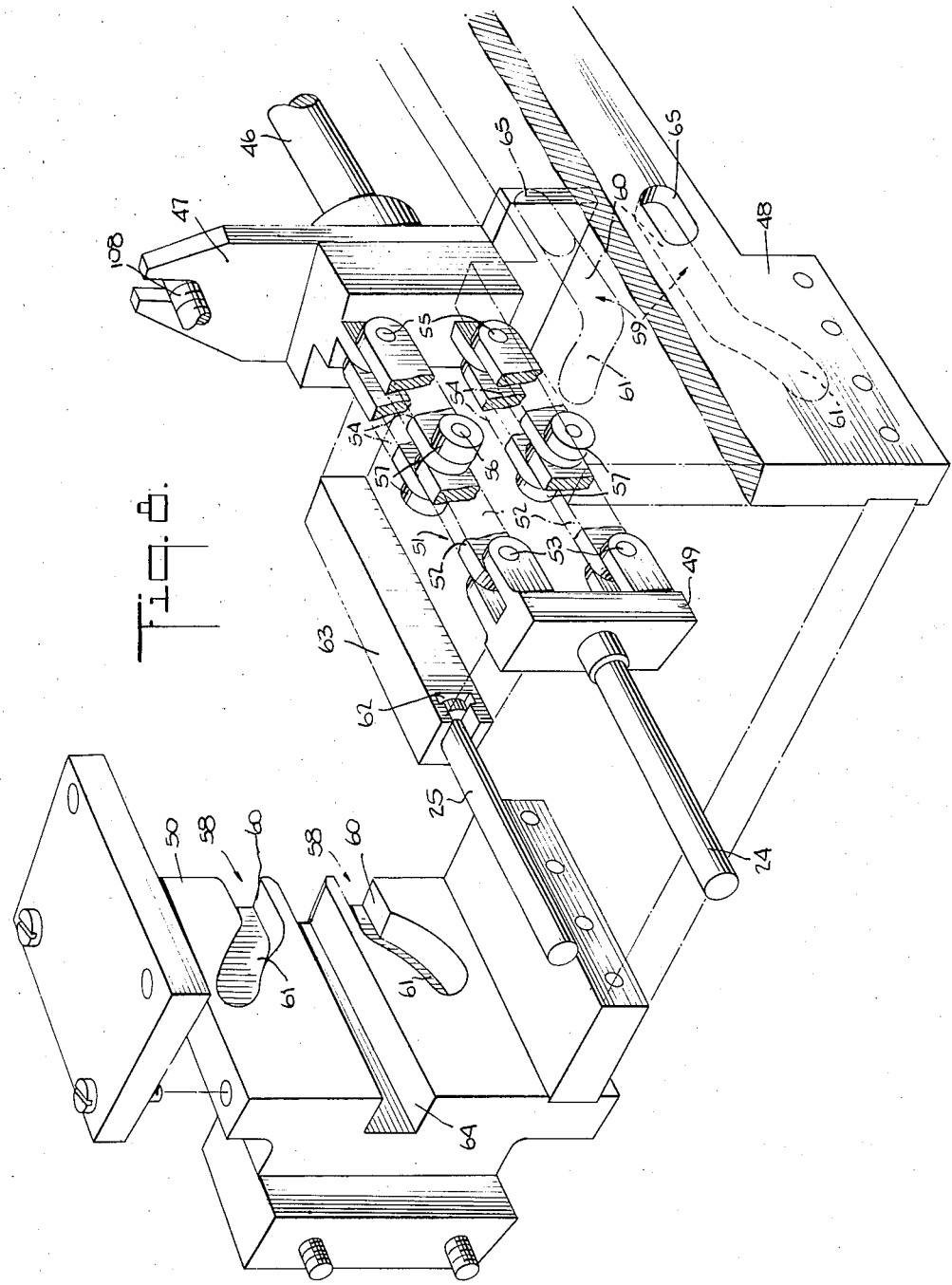

Dec. 7, 1965 LUN FAT KWAN 3,221,373
MOLDING APPARATUS FOR FORMING AN ARTIFICIAL MULTICOLORED FLOWER
Filed Dec. 18, 1961 7 Sheets-Sheet 7
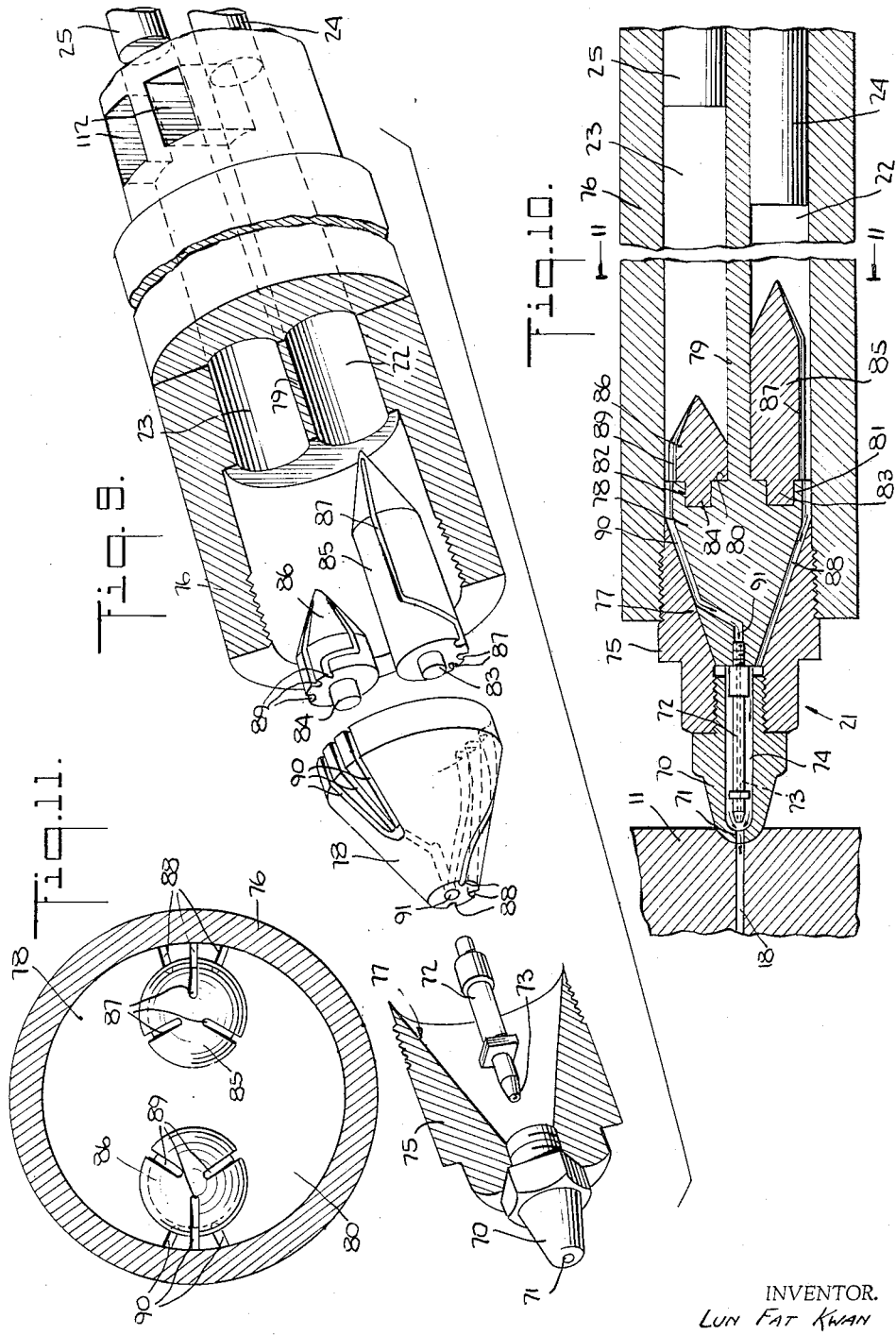
INVENTOR.
LUN FAT KWAN
BY
ATTORNEY United States Patent Office 3,221,373
Patented Dec. 7, 1965

3,221,373
MOLDING APPARATUS FOR FORMING AN ARTIFICIAL MULTICOLORED FLOWER
Lun Fat Kwan, Hong Kong, assignor, by mesne assignment, to Rico Limited, Kowloon, Hong Kong, a corporation of Hong Kong
Filed Dec. 18, 1961, Ser. No. 160,061
2 Claims. (Cl. 18—30)

The present invention relates to an improved apparatus for forming an artificial flower from plastic and having a plurality of colors therein.

Heretofore, artificial flowers have been made from plastics. However, since it has been difficult to control the arrangement of different colored plastics in a mold, such flowers have usually been monotoned. Attempts at multicolored flowers have resulted in flowers which have an artificial appearance.

The present invention has for one of its objects the provision of an improved mechanism for forming an artificial multicolored flower.

Another object of the present invention is the provision of an improved mechanism for forming a multicolored artificial flower wherein the resulting flower will have a more natural appearance.

Another object of the present invention is the provision of an improved mechanism for making a multicolored artificial flower which is simple an inexpensive to perform.

While the present invention is being described in connection with artificial flowers, it will be understood that the invention is not limited to the manufacture of an artificial flower but is adapted to be used in connection with the manufacture of any article and that the term "flower" as used herein is intended to include all foliage and all parts thereof, such as petals, flowers, leaves, etc., and is also intended to include articles other than foliage.

It will also be understood that while the present invention will be described in connection with plastics, other materials may also be used, as may be desired.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 2 is a top plan view of the mechanism shown in FIG. 1;

FIG. 3 is a detail side view of the improved injection mechanism partly in section showing the position of the parts when the first plastic is injected into the mold;

FIG. 4 is a top view partly in section showing the position of the parts during the injection of the first plastic;

FIG. 5 is a detail similar to FIG. 3 showing the position of the parts when the second plastic is injected into the mold;

FIG. 6 is a top plan view showing the position of the parts during the injection of the second plastic;

FIG. 7 is an exploded perspective view showing the mechanism for controlling the feeding of charges of plastic to the injection machine;

FIG. 8 is an exploded perspective view showing the injecting plunger assembly;

FIG. 9 is an exploded perspective view partly cut away, showing the injection nozzle assembly of the present invention;

FIG. 10 is a sectional view showing the injection nozzles in their assembled position;

FIG. 11 is a sectional view taken along line 11—11 of FIG. 10;

FIG. 12 is a sectional view of the mold showing the position of the first plastic when it is injected into the mold;

FIG. 13 is a sectional view similar to FIG. 12 showing the second plastic being injected into the mold;

FIG. 14 is a sectional view similar to FIG. 12 showing the position of the two plastics after the second plastic has been injected into the mold;

FIG. 15 is a perspective view showing a petal sheet made in accordance with the present invention; and FIG. 16 is a perspective view showing a plurality of petal sheets which have been assembled together into a finished flower.

Figure 1:
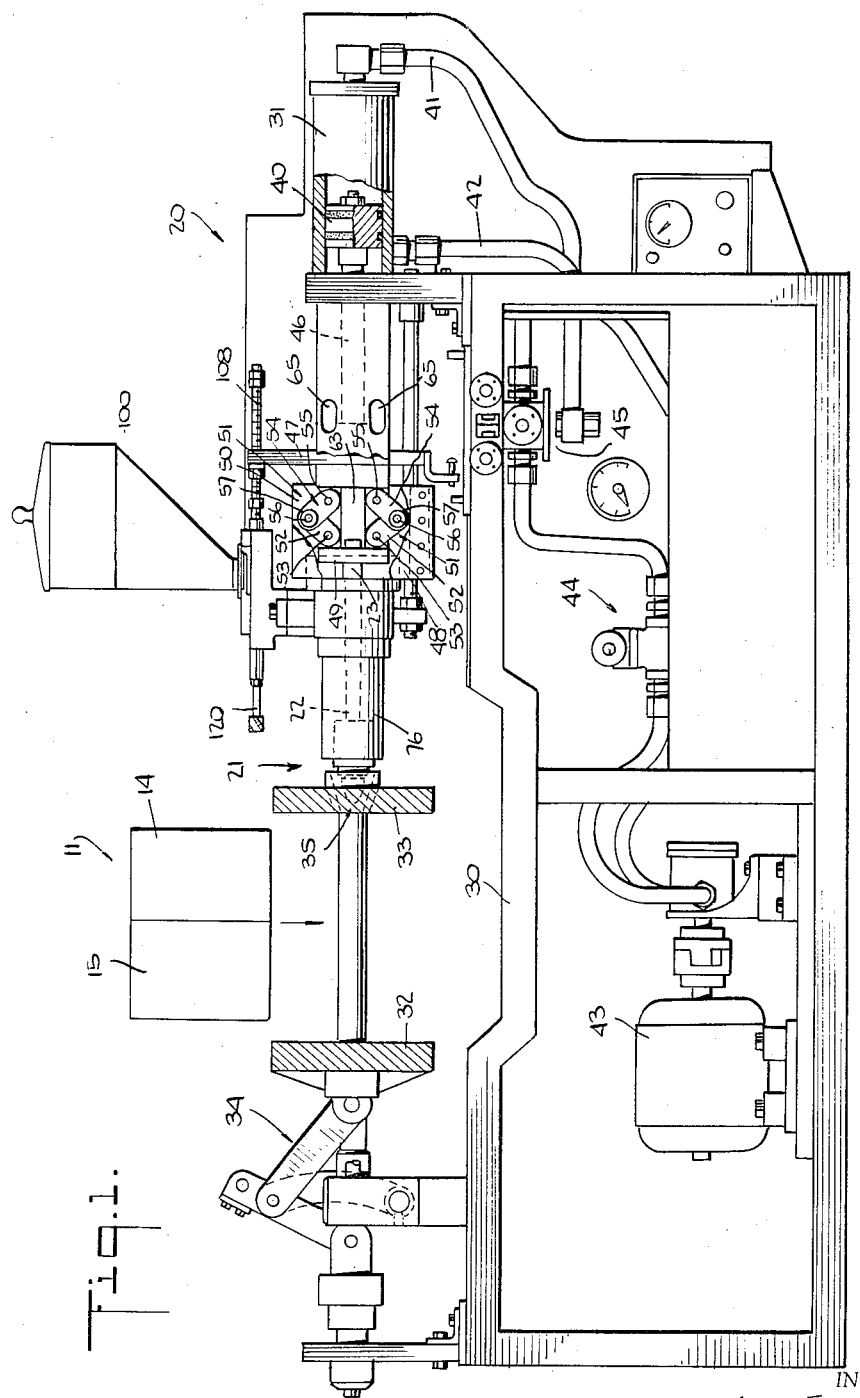
FIG. 1 is a side elevational view partly broken away and in section showing the improved injection mechanism of the present invention.

For convenience, the invention will first be described generally and details will be described under separate headings.

Method and product

The method of forming a flower in accordance with the present invention is illustrated in FIGS. 12 to 16.

The particular flower 1 shown in FIG. 16 is formed by first making a petal sheet 2. The petal sheet 2 comprises a central portion 3 having a central opening 4 therein and provided with petals 5 radiating therefrom. The petals 5 may have an inner portion 6 of one color and an outer portion 7 of a different color.

While the petal sheet 2 which is shown in FIG. 5 is shown as having a plurality of radiating petals 5, it will, of course, be understood that the petal sheet 2 may have any desired shape depending on the type of flower which is being made and that it may be a single petal or a leaf, if desired.

After a plurality of petal sheets 2 have been formed in a manner to be described hereinbelow, they are assembled together on a suitable stem 8, as shown in FIG. 16, to form the finished flower 1. Here again, FIG. 16 merely illustrates one of the many flowers which may be made by the present invention.

The method comprises the injection of a first plastic 10 of one color into the mold cavity 19 of a mold 11 as shown in FIG. 12, and immediately thereafter injecting a second plastic 12 of a different color into the mold 11 so that the second plastic 12 will travel through the first plastic 10 and pierce the tip 13 thereof, as shown in FIG. 13, and completely fill the mold 11.

While the invention is being described in connection with plastic of different colors, it will be understood that the present invention may also be used with plastics having the same color but different characteristics.

The mold 11 may be the usual injection mold which is in common use today. The particular mold which is shown in the drawing comprises two mold halves 14 and 15, each of which is contoured at 16 and 17 respectively, so that when the two mold halves 14 and 15 are brought together, the two contours 16 and 17 match with each other to form the mold cavity 19. Since the mold cavity 19 shown in the drawings is to form the petal sheet 2, it is shaped to correspond to the shape of the petal sheet 2.

The mold 11 is adapted to be fed by a suitable injection nozzle assembly 21 which will be described in greater detail hereinafter, through a feed orifice 18, as shown in FIG. 4.

Preferably, the second plastic 12 is not injected until the outside areas of the first plastic 10 have congealed slightly, however, the second plastic 12 should be injected while the inner portions of the first plastic 10 are still in a plastic state. Thus, while the first plastic 10 is still molten, the second plastic 12 will travel through the inside of the first plastic 10, as shown in FIG. 13, and pierce the slightly congealed tip 13 thereof.

Furthermore, it is preferred that the first plastic 10 be injected into the mold only until it fills about one-fourth of the mold cavity 19 and that the second plastic 12 is injected into the mold to completely fill the mold cavity. However, of course, it will be understood that these proportions are merely preferred proportions and that the relative amounts of the particular plastics used may be changed, as may be desired.

It will further be noted that the dark colored plastic 10 is preferably injected first so that when the light-colored second plastic 12 is injected, it will not show through the darker colored first plastic 10. However, it will be understood that, if desired, the light-colored plastic may be injected first and the dark-colored plastic may be injected thereafter, as may be desired.

The resulting structure, as shown in FIG. 15, will be a petal sheet 2 having a plurality of petals radiating therefrom. The inner portion of each petal will be of one color and the outer portion 7 thereof will have a different color. The tip of each petal, made of the second plastic 12, will have a thinner portion extending rearwardly within the first plastic 10 so as to be securely held in place. In addition, since the two plastics will be completely integrated with and fused with each other, not only will the bond between the two be strengthened but also the colors will blend with each other to form a natural looking flower.

*General description of mechanism*

Referring more particularly to FIG. 4, which shows the mechanism for performing the method described above, the molding machine 20 comprises the usual injection nozzle assembly 21 which, as shown in the drawing, is in communication with first feed passageway 22 and second feed passageway 23. The injection nozzle assembly 21 is positioned so that it communicates with the feed orifice 18 in the mold 14 to thereby inject the plastic directly into the mold cavity.

First and second feed plungers 24 and 25 are positioned in each of the feed passageways, 22 and 23, respectively, and are adapted to be moved therewithin. It will be noted that first feed plunger 24 extends forwardly beyond the second feed plunger 25 so that it will be the first to inject plastic into the mold 14 when the two feed plungers 24 and 25 are moved forward.

A charge of plastic is first dropped into each feed passageway 22 and 23. These charges are preferably of different colors, but they may be the same color and have different proportions. When the two feed plungers 24 and 25 are moved forward, the first feed plunger 24 will inject the first plastic 10 (FIGS. 12 to 14) into the mold cavity 19. The forward movement of the first feed plunger 24 is then stopped, in a manner which will be described hereinafter, so that the injection of the first plastic 10 is stopped. However, the second plunger 25 continues its forward movement to inject the second plastic 12 into the mold to thus completely fill the mold, as described above.

*Molding machine*

Referring to FIGS. 1 and 2 of the drawings, the molding machine 20 comprises a frame 30 having a plunger actuating a hydraulic cylinder 31 and a pair of mold clamping plates 32 and 33. The clamping plate 32 is connected to a toggle mechanism 34 which moves the plate 32 toward plate 34 to hold the mold 11 tightly therebetween. Clamping plate 33 has an opening 35 therein adapted to accommodate the nozzle assembly 21 and is adjustable relative to nozzle assembly 21 by means of screws 36.

The hydraulic cylinder 31 has a piston 40 movable therein and has a hydraulic hose 41 connected thereto behind piston 40 to move the piston 40 forward and a hydraulic hose 42 connected thereto in front of piston 40 to move the piston 40 rearwardly. The hydraulic fluid, which may be liquid or gaseous, as may be desired, is pumped through the hoses 41 and 42 by a motor 43 through suitable valve assemblies 44 and 45.

The piston 40 has a piston rod 46 extending forwardly therefrom. A piston plate 47 having the feed plungers 24 and 25 operatively connected thereto is mounted on the forward end of the piston rod 46. Thus when the feed plungers 24 and 25 are to be advanced to inject the plastic into the mold, hydraulic fluid is admitted into cylinder 31 behind piston 40 through hydraulic hose 41 to move the piston 40 and the feed plungers 24 and 25 forwardly. When the feed plungers 24 and 25 are to be retracted after both plastics have been injected, hydraulic fluid is admitted into the cylinder 31 in front of piston 40 by means of hose 42 to move the piston 40 and its associated feed plungers 24 and 25 rearwardly.

It will, of course, be understood that the hydraulic system for controlling the advancement and retraction of the feed plungers 24 and 25 shown and described herein is merely illustrative and that the other means for advancing or retracting the feed plungers may be used, as may be desired.

*Feed plunger controlling mechanism*

The feed plunger controlling mechanism is shown in detail in FIG. 8 and comprises a pair of side plates 50 and 48 between which the plungers 24 and 25 are movable.

The first feed plunger 24 is mounted to the piston plate 47 through the toggle assembly 51 comprising two links 52 located one above the other pivotally mounted at 53 to a plunger plate 49, from which the first feed plunger 24 extends, and two pairs of links 53 pivoted at one end 55 to piston plate 47 and at the other end to links 52 by means of pins 56.

A pair of cam followers, in the form of rollers 57, are mounted on each pivot pin 56 and are adapted to enter cams 58 and 59 in side plates 50 and 48 respectively. The cams 58 and 59 each have straight paths 60 substantially perpendicular to the line of movement of feed plunger 24 and diverging paths 61 which point away from each other and which form an angle to the straight paths 60. Suitable openings 61 in the side plate 48 permit access to the toggle assemblies 51.

Thus when the piston plate 47 is moved forward by piston rod 46 the cam followers 57 will first move along the straight paths 59 of the cams in a direction parallel to the first feed plunger 24 to hold the toggle assemblies in the straight horizontal positions shown in FIG. 3. Since force is applied directly to the first feed plunger 24 by the toggle assemblies, it will move forward to inject the first plastic.

However, when the cam followers 57 reach the diverging paths 61 of the cams, the cam followers 57 move away from each other to fold the toggle assemblies to the position shown in FIG. 5. Although the piston plate 47 is continuously being moved forward by the piston rod 46, this forward motion is not imparted to the first feed plunger 24 since the force is being diverted away from a straight line parallel to the first feed plunger 24 to a line angled thereto. Hence the first fed plunger 24 is not moved forward and the injection of the first plastic 10 is stopped.

The second feed plunger 25 is positioned in a slot 62 in a block 63 which is mounted directly on piston plate 47 and is movable in a groove 64 in side plate 50 between the two cams 58. Since the second feed plunger 25 is coupled directly and positively to the piston plate 47 it will always respond to movement of piston plate 47. Thus when the piston plate 47 is moved forward the first feed plunger moves forward and vice versa.

It will be seen that with this structure when the petal sheet 2 (FIG. 15) is to be formed, the piston plate 47 is moved forward by piston rod 46. The cam followers 57 on toggle assemblies 51 move in the straight paths 60 of the cams 58 so that positive movement is imparted to the first feed plunger 24 and, since the second feed plunger 25 is directly coupled to the piston plate 47, forward movement is also imparted to the second feed plunger. Thus both feed plungers 24 and 25 are moved forward simultaneously. However, since the first feed plunger 24 extends forwardly beyond the second feed plunger, it will act on the plastic 10 in the first feed passageway 22 before the feed plunger 25 acts on the second plastic 12 so that the first plastic 10 is injected first into the mold cavity 19. However, as soon as the cam followers 51 reach the divergent portions 61 of the cams 58 and 59, they start to move apart and the toggle assemblies begin to fold so that no more forward movement is imparted to the first feed plunger 24 and injection of the first plastic 10 stops. However, forward pressure is still being applied to the second feed plunger 25 so that it acts on the second plastic 12 in the second feed passageway 23 to inject the second plastic 12 into the mold cavity 19 to complete the petal sheet 2.

After a petal sheet 2 is complete, the two feed plungers are withdrawn and placed in position for a second injection cycle.

*Nozzle assembly*

The nozzle assembly 21 of the present invention is shown in detail in FIGS. 9 through 11 and comprises an outer first injection nozzle 70 having a first feed conduit 71 and an inner second injection nozzle 72 having a second feed conduit 73 therein mounted within a bore 74 in the first injection nozzle 70.

The second feed conduit 73 is in axial alignment with the first feed conduit 71 so that plastic from the second feed nozzle 72 will be injected through first feed conduit 71 which acts as a common outlet for both injection nozzles.

The first injection nozzle 70 is threadably mounted in a sleeve 75 which is threaded to a feed passageway housing 76 within which the feed passageways 22 and 23 are located. The inner surface 77 of the sleeve 76 is tapered and is adapted to fit over a conically shaped plug 78 mounted on the forward end of a web 79 within passageway housing 76. The second feed nozzle 72 is threadably mounted within the forward end of the plug 78.

The rear surface 80 of the feed plug 78 is provided with a pair of spaced holes 81 and 82 adapted to receive the plugs 83 and 84 of first and second feed cones 85 and 86 respectively, which extend into the feed passageways 22 and 23 and have tapered ends pointing in the direction of the feed plungers 24 and 25.

The first feed cone 85 is provided with a plurality of first feed grooves 87 which communicate with a plurality of first feed channels 88 on the periphery of plug 78. These in turn communicate with the bore 74 in the first feed nozzle 70 so that the first plastic 10 will be injected into the mold through first feed passageway 22, first feed grooves 87, first feed channels 88, bore 74 and first feed conduit 71.

The second feed cone 86 is shorter than the first feed cone 85 and is provided with a plurality of second feed grooves 89 located along its outer periphery which communicate with a plurality of second feed channels 90 located in the outer periphery of the plug 78 in diametrical opposition to the first feed channels 88. The second feed channels 90 converge short of the front end of the plug 78 and communicate with an internal bore 91. This internal bore 91 communicates with the second feed conduit 73 in the second feed nozzle 72. Thus the second plastic 12 will be injected into the mold cavity through second feed passageway 23, second feed grooves, 89, second feed channels 90, internal bore 91 in the plug, second feed conduit 73 in the second feed nozzle 72 and out through the first feed conduit 71 in the first injection nozzle 70.

When the feed plungers 24 and 25 are moved forward the first feed plunger 24 which extends forwardly beyond the second feed plunger 25 will be the first to move the plastic (which is first plastic 10) in the first feed passageway 22 forward. The first plastic 10 will move through the first feed grooves 87 of the first feed cone 85 and thereafter through the first feed channels 88 in the plug 78. From thence the plastic will move into the bore 74 of the first feed nozzle and out into the mold through the first conduit 73 therein. The second plastic 12 will be moved by the second feed plunger 25 in the second feed passageway 23 after the first feed plunger 24 is rendered inactive and will first pass through the second feed grooves 89 in the second feed cone 86 and then through the second feed channels 90 in the plug 78. Thereafter it will move through the internal bore 91 in the plug 78 and from thence will be sent through the second feed conduit 73 in the second feed nozzle 72 and thence out into the mold through the first feed conduit 71.

*Plastic charge control mechanism*

The mechanism for supplying a charge of plastic to each of the feed passageways is shown in FIG. 7.

Two reservoirs 100 and 101 adapted to hold the first and second plastics, respectively, (shown in outline in FIG. 7), communicate with openings 102 and 103 in a top plate 104 of the machine. Slidably mounted below top plate 104 is a charge plate 105 which has a pair of elongated charge openings 106 and 107 which is operatively connected to piston plate 47 by an adjustable screw 108.

The charge openings 106 and 107 are adapted to be moved by the piston plate 47 from a plastic-receiving position (FIG. 3) underlying the feed openings 101 and 102 to a plastic-releasing position (FIG. 5) overlying a plurality of aligned openings 109, 110, 111 and 109a, 110a, and 111a, respectively, in lower plate 113, block 114 and passageway cylinder 76 respectively. These openings 109 through 111 and 109a to 111a are offset from the openings 102 and 103 in the top plate but are in alignment with forward vent openings 116 and 117 in the top plate 104. The openings 109 to 111 and 109a to 111a communicate with feed passageways 22 and 23, respectively.

In this manner charges of plastic are dropped into the charge openings 106 and 107 of the slide 105 by the reservoirs 100 and 101 through the openings 102 and 103 in the top plate and when the piston plate 47 is moved forward by the piston rod 46, the two charges of plastic will be moved over the aligned openings 109 to 111 and 109a to 111a and thus drop into the feed passageways 22 and 23. The amount of plastic adapted to be received by the charge openings 106 and 107 in the slidable plate 105 is controlled by blocks 118 and 119 which are movable within the charge openings 106 and 107 by screws 120 and 121. In this manner the amount of plastic fed to the feed passageways 22 and 23 may be easily controlled by adjustment of the blocks 118 and 119 in the charge openings 106 and 107.

It will be seen that with this structure, when the feed plungers 24 and 25 are retracted, as shown in FIG. 3, a charge of plastic is dropped from each reservoir 100 and 101 into each charge opening 106 and 107. As soon as the feed plungers begin their forward movement, the charges in the openings 106 and 107 are moved over the aligned feed openings 109 to 111 and 109a to 111a, as shown in FIG. 5, so that both charges will drop onto the feed plungers 24 and 25. In this position, the plate 105 underlies the reservoirs 100 and 101 to prevent additional plastic from being deposited.

After the feed plungers 24 and 25 are retracted (FIG. 3), the two second charges drop into the feed passageways 22 and 23 and will be in position to be injected when the feed plungers are again moved forward for an injection operation cycle. Simultaneously, the feed openings 102 and 103 are exposed so that additional charges of plastic will be dropped into the charge openings 106 and 107.

Operation

The operation of the device will be obvious from the above description, but will be summarized hereinafter for convenience.

Assuming the parts to be in the position as shown in FIG. 3, a charge of plastic is located in each feed passageway 22 and 23 in front of feed plungers 24 and 25 and a charge of plastic has been dropped from the reservoirs 100 and 101 into charge opening 106 and 107 in slide plate 105.

When the plastic in the feed passageways is to be injected into the mold 11, the feed plungers 24 and 25 will be moved forward by piston rod 46. As the feed plungers 24 and 25 are moved forward, the first feed plunger 24 which extends beyond the second one, will be moved forward since the cam followers 57 of the toggle assemblies are moving in the straight portion of the cams. Thus the first feed plunger will inject the first plastic 10 into the mold cavity 19 through first feed groove 88 in first feed cone 86, first feed channels 88 in plug 78, bore 74 in first nozzle 70 and first feed outlet 71. The first plastic injected into the mold cavity 19 will assume the general shape shown in FIG. 12 and will preferably fill about one-fourth of the total volume of the mold cavity.

The injection of the first plastic 10 continues until the cam follower 57 of the two toggle assemblies 51 strikes the divergent paths 61 of the cams 58. The toggle assemblies fold so that the first feed plunger is no longer being moved forward and injection of the first plastic 10 stops. However, the second feed plunger is still being moved forward and will inject the second plastic into the mold cavity through feed grooves in second cone 86, feed channels in plug 78, second conduit 73 in second injection nozzle 72 and outlet 71. The interim period between the injecting of the first and second plastics is sufficient to permit the outer surface of the first plastic to congeal slightly but not sufficient to harden the inner portions which remain molten. The second plastic 12 will travel through the first plastic 10 and pierce through the tip of the first plastic 10 to fill the mold cavity 19 as shown in FIG. 13.

In the meantime, while the two feed plungers are being moved forward, the slide plate 105 is also being moved forward and when it assumes the position shown in FIG. 5 the charge openings 105 and 106 overly the feed openings 109 to 111 and 109a to 111a, both charges will drop down over the feed plungers so that when the feed plungers so that when the feed plungers are retracted, the plastic charges in these openings 109 to 111 and 109a to 111a will drop down into the feed passageways in front of the feed plungers and will be in a position to be injected into the mold when the plungers are again moved forward.

It will thus be seen that the present invention provides an improved mechanism and method of forming an artificial multicolored effect in which the resulting flower will have a more natural appearance and which is simple and inexpensive to perform.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A molding mechanism comprising a nozzle assembly, a first passageway for injecting a first plastic into a mold through said nozzle assembly, a second passageway for injecting a second plastic into said mold through said nozzle assembly, said two passageways being substantially parallel to each other, a feed plunger in each of said passageways, means for moving said feed plungers simultaneously in said passageways toward said nozzle assembly, the feed plunger in said second passageway being positively connected to said moving means, means for stopping the movement of the feed plunger in said first passageway while the feed plunger in the second passageway is being moved by said moving means, said stopping means comprising a toggle assembly interposed between the feed plunger in the first passageway and said moving means, said toggle assembly having a cam follower thereon, a cam in said molding mechanism having a portion parallel to the path of linear movement of said plungers and another portion directed away from said path of linear movement, said cam follower being movable in said cam, said toggle assembly including a link operatively connected at one end to the feed plunger in the first passageway another link connected at one end to the moving means, said two links being connected together by a pivot at their other ends and said cam follower being mounted on said pivot, whereby translation of the first forward movement of said moving means to the plunger in the first passageway is prevented when said cam follower enters the portion of the cam directed away from the path of linear movement.

2. A molding mechanism as claimed in claim 1 wherein a slidable charge plate is operatively associated with and movable by said moving means from a retracted to an extended position, said charge plate having openings therein each of which is adapted to receive a charge of plastic from a reservoir when the plate is in retracted position, a channel in said molding mechanism communicating with each of said feed passageways, the openings in the charge plate being adapted to overlap the channels when the charge plate is in the extended position to deposit the charges of plastic into said channels for delivery to said feed passageways.

References Cited by the Examiner

UNITED STATES PATENTS

| | | | |
|---|---|---|---|
| 936,722 | 10/1909 | Howard | 18—13 |
| 1,341,528 | 5/1920 | Walling | 25—123 |
| 1,918,127 | 7/1933 | Pfieffer | 264—241 |
| 2,253,810 | 8/1941 | Poux | 18—30 |
| 2,271,063 | 1/1942 | DeMattia | 18—30 |
| 2,418,856 | 4/1947 | Stacy | 18—30 |
| 2,448,947 | 9/1948 | Arthur et al. | 18—30 |
| 2,498,652 | 2/1950 | Daly | 154—43 |
| 2,696,640 | 12/1954 | Wienand | 18—30 |
| 2,748,042 | 5/1956 | Borgese | 154—43 |
| 3,015,848 | 1/1962 | Hollfritsch | 18—30 |
| 3,061,879 | 11/1962 | Montpeat | 18—30 |

FOREIGN PATENTS

| | | |
|---|---|---|
| 1,159,247 | 2/1958 | France. |
| 842,153 | 7/1960 | Great Britain. |

ROBERT F. WHITE, *Primary Examiner.*

ALEXANDER H. BRODMERKEL, *Examiner.*